United States Patent [19]

Lian

[11] Patent Number: 5,522,713

[45] Date of Patent: Jun. 4, 1996

[54] DIRECT DRIVE ELECTRO-MECHANICAL PRESS FOR ENCAPSULATING SEMICONDUCTOR DEVICES

[75] Inventor: Tiang S. Lian, Singapore, Singapore

[73] Assignee: Advanced Systems Automation PTE Ltd., Singapore, Singapore

[21] Appl. No.: 473,513

[22] Filed: Jun. 7, 1995

Related U.S. Application Data

[63] Continuation of Ser. No. 162,642, Dec. 3, 1993, abandoned.

[30] Foreign Application Priority Data

Feb. 4, 1992 [GB] United Kingdom .................. 9225356

[51] Int. Cl.⁶ .......................... B29C 45/02; B29C 45/66; B29C 45/80
[52] U.S. Cl. ................. 425/116; 264/40.1; 264/272.17; 425/121; 425/129.1; 425/145; 425/149; 425/150; 425/544; 425/590; 425/593; 425/451.2; 425/DIG. 228
[58] Field of Search ................................ 425/116, 121, 425/145, 149, 150, 161, 168, 544, 590, 591, DIG. 288, 588, 129.1, 593, 451.2, 451.6; 264/40.1, 40.5, 272.17

[56] References Cited

U.S. PATENT DOCUMENTS

| | | | |
|---|---|---|---|
| 4,599,062 | 7/1986 | Konishi | 425/116 |
| 4,820,464 | 4/1989 | Sasaki et al. | 264/40.1 |
| 4,828,475 | 5/1989 | Kamiguchi | 425/150 |
| 4,828,476 | 5/1989 | Yoshiharu et al. | 425/590 |
| 5,087,190 | 2/1992 | Laghi | 425/145 |
| 5,176,859 | 1/1993 | Leffew | 425/145 |
| 5,328,347 | 7/1994 | Vaarwerk | 425/544 |

FOREIGN PATENT DOCUMENTS

| | | |
|---|---|---|
| 0280087 | 8/1988 | European Pat. Off. . |
| 0285672 | 10/1988 | European Pat. Off. . |
| 9204244 | 5/1983 | Japan . |
| 2225552 | 6/1990 | United Kingdom . |
| 2225552 | 4/1992 | United Kingdom . |

Primary Examiner—Khanh P. Nguyen
Attorney, Agent, or Firm—Merchant, Gould, Smith, Edell, Welter & Schmdit

[57] ABSTRACT

A direct drive electro-mechanical press for encapsulating semiconductor devices has at least a clamping axis and a transfer axis. The clamping axis has a planetary roller screw coupled to a tie bar platen assembly on which at least one top mold is mounted. A two-speed gearbox is further coupled to the clamping axis for switching between a high speed mode and a high torque mode along the clamping axis. The two-speed gearbox has a high speed clutch coupled to a speed reducer and a high torque clutch respectively. The transfer axis is slidably located above the clamping axis; the transfer axis has another planetary roller screw coupled to a bottom platen on which at least one bottom mold is mounted. The transfer axis transfers the molding resin from the pot into the cavities formed when the top and bottom molds are clamped together. The use of two-speed gearbox and planetary roller screw along the clamping axis and the use of planetary roller screw along the transfer axis not only reduce the number of joints or links required under prior art systems, but also permit the press to deliver superior velocities and clamping tonnage. A closed-loop control is provided to the clamping and transfer axes respectively for minimizing the disproportionate drive from the electro-mechanical press. In addition to the controllers and drives, the closed-loop control provides direct feedback on the clamping tonnage on the tie bars and transfer pressure in the mold blocks.

7 Claims, 10 Drawing Sheets

DIRECT DRIVE ELECTRO-MECHANICAL PRESS FOR ENCAPSULATING SEMICONDUCTOR DEVICES

This is a File Wrapper Continuation application of application Ser. No. 08/162,642, filed Dec. 3, 1993, now abandoned.

BACKGROUND OF THE INVENTION

1. Field of the Invention

The present invention relates to a method and apparatus for encapsulating semiconductor devices in an automatic molding system which complies with the high volume output requirement for semiconductor manufacturing. In particular, the present invention pertains to a direct drive electro-mechanical press for encapsulating semiconductor devices in a clean room environment which is ideal for in-line semiconductor manufacturing systems. By in-line manufacturing systems, the present invention refers to systems where all the machines necessary for producing the end product are laid out in line, thus minimizing the transportation and handling of the product which is in process between machines.

2. Description of the Related Art

Traditionally encapsulation of semiconductor devices is accomplished by using a transfer hold tool mounted onto a press. The press serves two functions: (1) the press provides the clamping tonnage to clamp the molds together in order to prevent bleeding and flashing of the resin during the encapsulation process, and (2) the press provides the transfer action to transfer the molding resin compound into the mold cavities. The presses used for molding semiconductor devices in the encapsulation process are hydraulic based. Examples of hydraulic presses include U.S. Pat. No. 4,599,062 and Japan Patent No. J5 9204-244-A.

The main disadvantages of a hydraulic transfer press are the contaminations from hydraulic leakages and oil fumes generated from the hydraulic pump system. As a result, the molding operation using a hydraulic press has to be isolated from the front-end of the encapsulation process which involves die attach, wire bonding and etc. because those operations are performed in a clean room environment.

As semiconductor fabrication operations are moving towards in-line systems, it is essential to integrate various processes including the molding operation in a clean room environment. An electro-mechanical press using a toggle mechanism has been developed recently to overcome the problems encountered during the molding process using a hydraulic press.

While the electro-mechanical press for encapsulating semiconductor devices overcomes the problems of the prior art systems featuring a hydraulic press, it has two major disadvantages: high wear at the joints, and disproportionate drive control.

The toggle mechanism used in an electro-mechanical press consists of a plurality of linkages and joints. In semiconductor encapsulation process under an in-line system, the linkages and joints experience high rate of wear and tear. As such, frequent maintenance and down time are incurred to prevent the failure of the total system.

The toggle mechanism in an electro-mechanical press relies on the principles of mechanical advantage. It follows that the output from the servo motor is used as an input to the plurality of linkages and joints. The disadvantage of the toggle mechanism lies in the disproportionate amplification of the input to the linkages and joints. In other words, the amplified output of the servo motor from the toggle mechanism is not constant. The magnitude of amplification depends on the angles between the output links and the input links. In a typical press for encapsulating semiconductor devices, there are at least four links called the tie bars. The amplification factors increase exponentially during the last phase of clamping. As a result, the disproportionate amplification of the servo motor output can either over-clamp or break the tie bars.

The present invention comprises a direct drive electro-mechanical press for encapsulating semiconductor devices. The press has at least two axes-a clamping axis and a transfer axis. The clamping axis comprises a planetary roller screw coupled to a tie bar platen assembly on which at least one top mold is mounted. A two-speed gearbox is further coupled to the clamping axis for switching between a high speed mode and a high torque mode along the clamping axis. The two-speed gearbox comprises a high speed clutch coupled to a speed reducer and a high torque clutch respectively. The transfer axis is slidably located above the clamping axis; the transfer axis comprises another planetary roller screw coupled to a bottom platen on which at least one bottom mold is mounted. The transfer axis transfers the molding resin from the pot into the cavities formed when the top and bottom molds are clamped together. The use of two-speed gearbox and planetary roller screw along the clamping axis and the use of planetary roller screw along the transfer axis not only reduce the number of joints or links required under prior art systems, but also permit the press to deliver superior velocities and clamping tonnage.

A closed-loop control is provided to the clamping and transfer axes respectively for minimising the disproportionate drive from the electro-mechanical press. In addition to the controllers and drivers, the closed-loop control provide direct feedback on the clamping tonnage on the tie bars and transfer pressure in the mold blocks. While better system control is achieved, problems associated with disproportionate drive from the servo motors such as breakdown due to over-clamping are minimized.

DETAILED DESCRIPTION OF THE INVENTION

A direct drive electro-mechanical press for encapsulating semiconductor devices in a clean room environment is described. In the following description, numerous specific details are set forth such as molding blocks, tie bars, pressure transducers, etc. in order to provide a thorough understanding of the present invention. It will be obvious to one skilled in the art that the present invention may be practised without these specific details. In other instances, well-known parts such as those involved with the die attach, wire bonding and trim forming are not shown in order not to obscure the present invention.

Notation and Nomenclature

The detailed description with respect to the functions of the servo-controller and programmable logic controller of the present invention relating to the closed-loop control are presented partially in terms of algorithm and symbolic representation upon operation on data bits within the computer memory. These algorithmic descriptions and representations are the means used by those skilled in the art in the data processing art, to most effectively convey the substance of their work to others skilled in the art.

An algorithm is here, and generally, conceived to be a self-consistent sequence of steps leading to a desired result. These steps are those require physical manipulation of physical quantities. Usually, though not necessarily, these quantities take the form of electrical or magnetic signals capable of being stored, transferred, combined, and otherwise manipulated. In this case, the physical quantities are voltage signals which correspond to the pressures at the tie bars and resin compound respectively. It proves convenient at times, principally for reason of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities.

Further, the manipulations performed are often referred to in terms such as adding or comparing, which are commonly associated with the mental operations performed by a human operator. No such capability of a human operator is necessary, or desirable. In most cases, in any of the operations described herein which form part of the present invention; the operations are machine operations. Useful machines for performing the operations of the present invention include general purpose digital computers or similar devices such as processors or controllers. In all cases, it should be borne in mind that there is a distinction between the method operation in operating a computer and the method of computation itself. The present invention relates to method steps for operating a computer in processing electrical or other (for example, mechanical, chemical) physical signals to generate other desired physical signals.

The present invention also relates to an apparatus for performing these operations. This apparatus may be specially constructed for the required purpose or it may comprise a general purpose computer as selectively activated or reconfigured by a computer program stores in the computer. The algorithms presented herein are not inherently related to any particular computer or other apparatus. In particular, various general purpose machines may be used with programs written in accordance with the teachings herein, or it may prove more convenient to construct specialized apparatus to perform required method steps. The required structure for a variety of these machines would appear from the description given below.

General System Configuration

Figure 1:
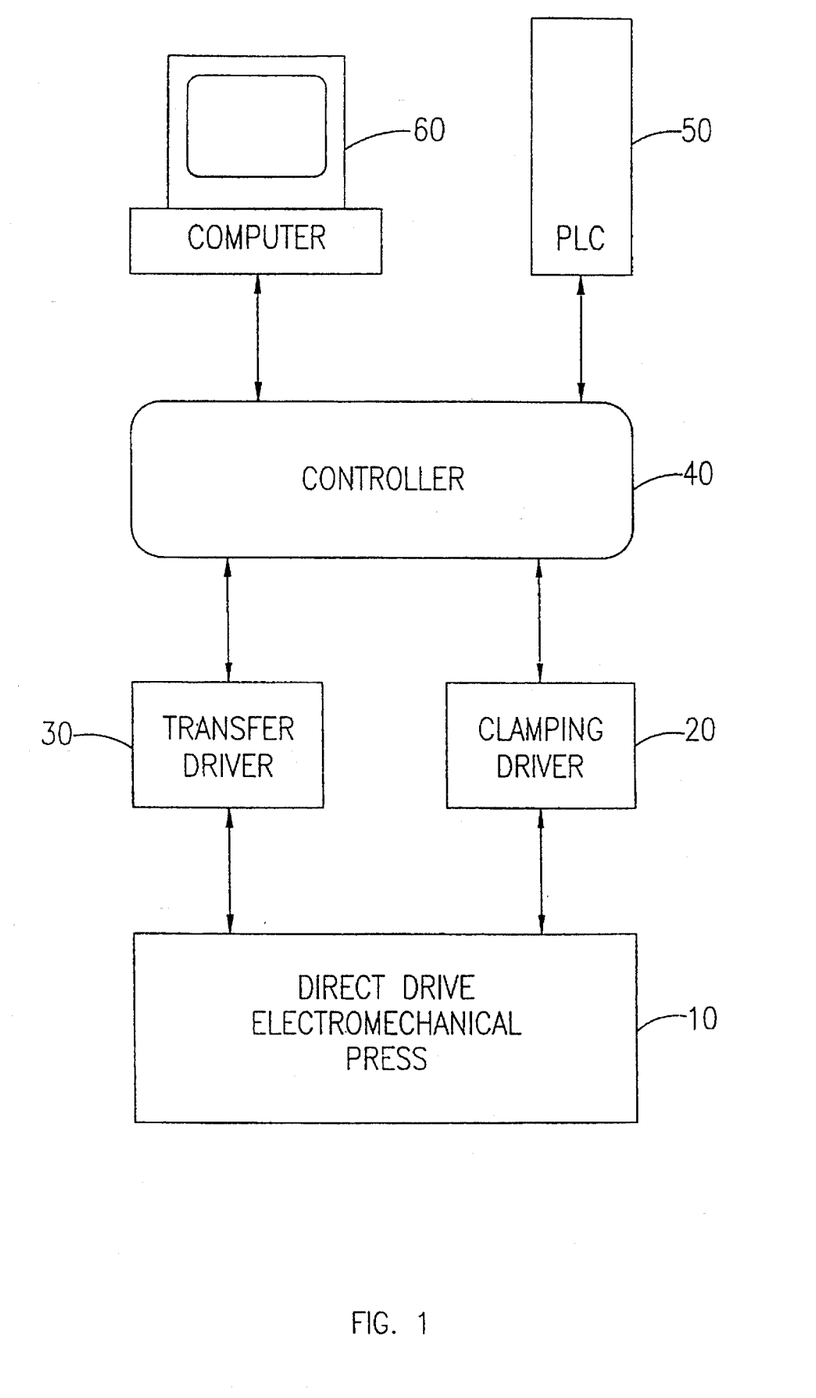
FIG. 1 is block diagram illustrating the general system configuration of the preferred embodiment of the present invention.

FIG. 1 shows a molding system for encapsulating semiconductor devices according to the present invention. Shown there is a press 10 coupled to a clamping driver 20 and transfer driver 30 for clamping the molds and transferring molding compounds into the cavities of lead frame in the semiconductor encapsulation process. A programmable logic controller 50 and a computer 60 are coupled to the clamping driver 20 and the transfer driver 30 over a servo controller 40. The servo controller 40 activates and disables the clamping and transfer motors in response to predetermined threshold parameters with the assistance of an unique closed-loop control the details of which will be elaborated further below in FIG. 7. While the programmable logic controller 50 controls all sequence of system operations such as the loading of resin compound pellets, transporting the lead frames etc, the computer 60 performs data acquisitions from the sensors at various strategic locations of the press 10 and displays the same. It should be understood by one skilled in the art that the block diagrams in FIG. 1 pertain only to the mold clamping and transferring operation of a semiconductor encapsulating system. It follows that other front end stages such as die attach and wire bonding as well as back and stages such as post curing and trim & forming are not shown in order not to obscure the present invention.

Figure 2:
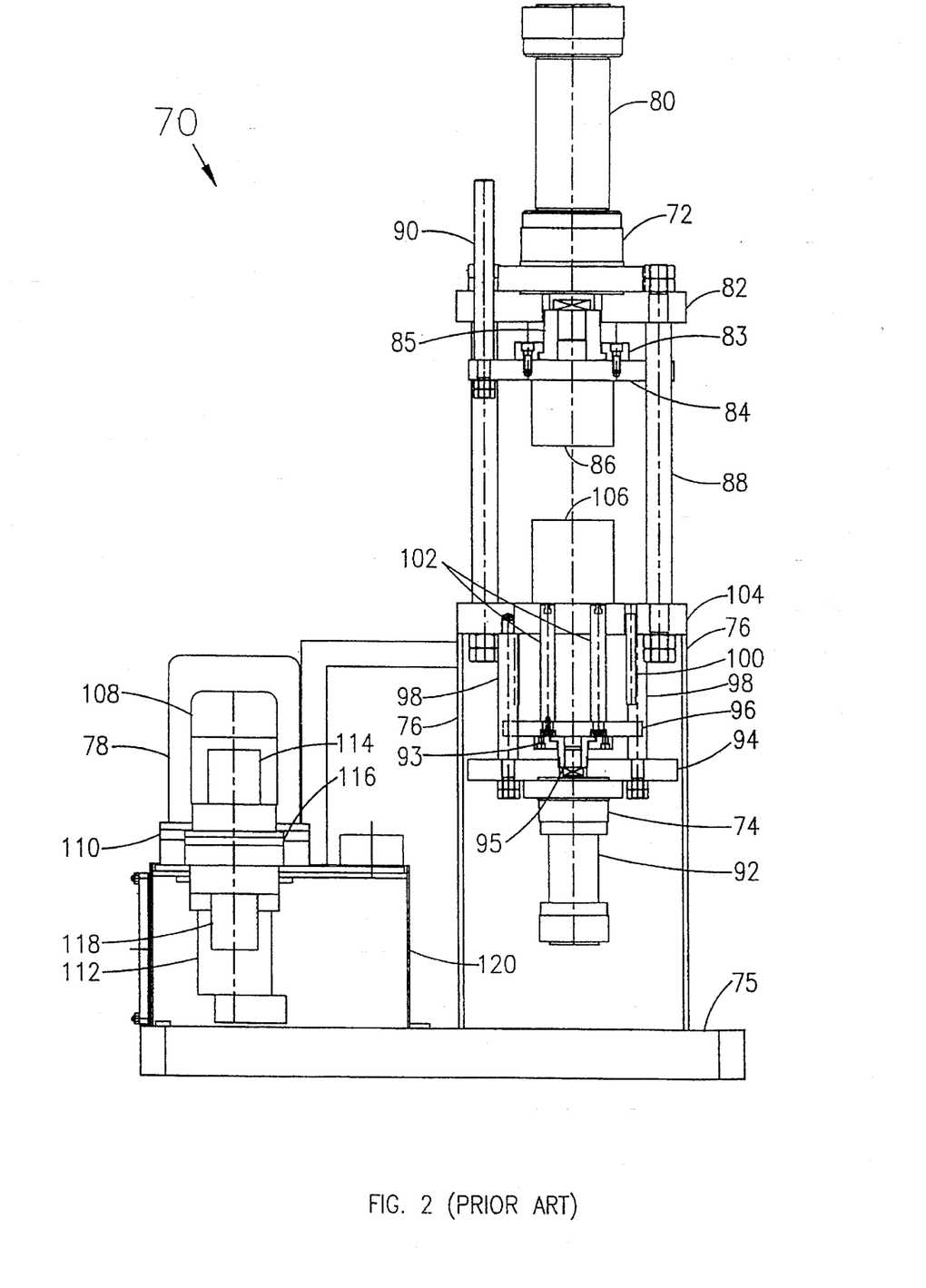
FIG. 2 is a side sectional view of a prior art hydraulic press used for encapsulating semiconductor devices.

FIG. 2 illustrates a prior art hydraulic press 70. The press 70 is incorporated as part of an automatic, multi-plunger molding system ASA 808 manufactured by the assignee of the present invention. See product brochure of ASA 808. The hydraulic press 70 comprises a clamping section 72 being slidably located above a transfer section 74. The transfer section 74 is secured to a press base 75 and a press frame 76. A hydraulic pumping section 76 is also secured to the press base 75 for providing clamping and transfer power to the clamping section 72 and the transfer section respectively.

Referring again to FIG. 2, the clamping section 72 consists of a clamping cylinder 80 being fastened on the top surface of a top platen 82 and a ram platen 84. A top mold 86 is secured to the bottom surface of the ram platen 84 which is further coupled to the cylinder 80 by a plurality of split flanges 83. The top platen 82 is coupled to the upper end of a plurality of columns 88 while the lower end of the columns 88 are coupled to the bottom platen 104. Preferably the top platen 82, the ram platen 84 and the bottom platen 104 are parallel relative to each other. Similarly the columns 88 and the guiding rod 90 are parallel to each other and perpendicular to the top platen 82, the ram platen 84 and the bottom platen 104. The ram platen-top mold assembly moves slidably along an axis parallel to the axis of the columns 88 and guided by the guiding rod 90.

In FIG. 2 the transfer section 74 consists of a transfer cylinder 92 being coupled to a transfer cylinder platen 94 and further to an ejector support plate 96. The transfer cylinder 92 is connected to an electric motor 114 and the hydraulic fluid tank 120 for receiving power therefrom for ejecting molten resin compound along path parallel to that of a plurality of transfer rod 102 into top mold 106 which is secured on the top surface of the bottom platen 104.

While the clamping section is activated, the clamping cylinder 80 moves the top mold 86 down onto the bottom mold 106 along the path parallel to the columns 88 and the guiding rods 90. Not shown in FIG. 2 is the lead frame which is understood to be placed within the cavity formed by the clamped molds. Thereafter, the transfer section will eject resin compound into the cavity of the clamped molds. The assembly consisting of the clamped molds and encapsulated lead frames are then transported to the next section which is the curing section.

As mentioned above, the disadvantage of a hydraulic press are the contaminations from the hydraulic system and the unevenness drive. On one hand, the hydraulic leakage renders such press less suitable for in-line systems, the disproportionate drive from the servo motor results in high wear and tear of the joints and linkages of the press.

Figure 3:
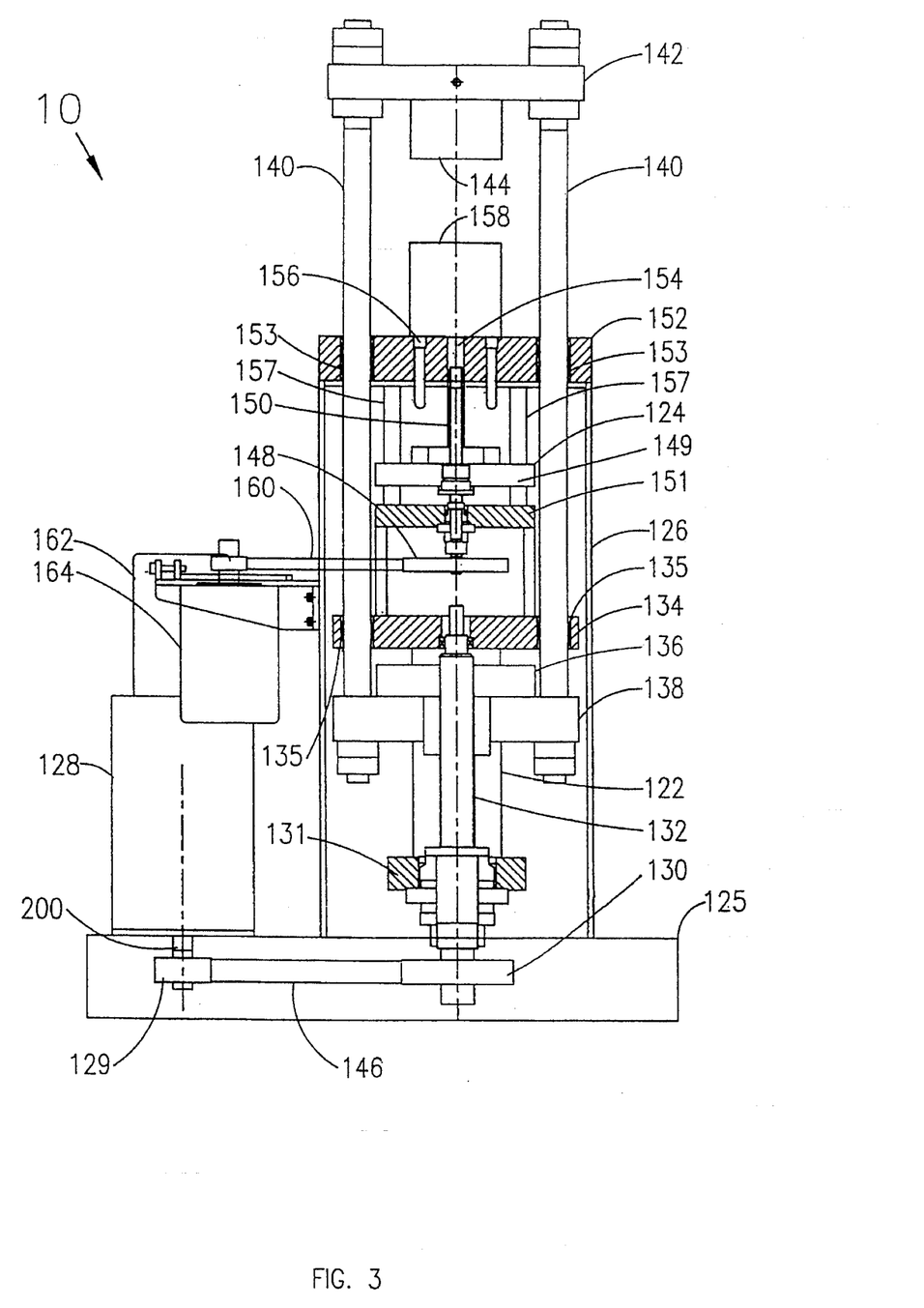
FIG. 3 is a side sectional view of the preferred embodiment of the present invention for encapsulating semiconductor devices.

FIG. 3 is a side sectional view of the preferred embodiment of the present invention. The direct drive electromechanical press 10 comprises a clamping axis 122, a transfer axis 124, a press base 125 supporting a press frame 126, and a two speed gear box 128. The clamping axis 122 consists of a pulley 130 coupled axially to a clamping planetary roller screw 132, a roller nut 136, a bottom tie bar platen 138, a plurality of tie bars 140, a top tie bar platen 142 and a top mold 144. The pulley 130 is coupled to the two speed gear box 128 over a belt 146 for receiving clamping power therefrom. The planetary roller screw is a product of GSA-Gewinde Satelliten Antriebe AG, Horriwil, Switzerland, and is used for handling rotational speeds which are several fold higher than those of conventional ball screws. In the preferred embodiment of the present invention, the clamping axis travels at a speed of 100 mm/sec in the high speed mode. Moreover, the planetary roller screw withstands a maximum 50 tons axial load in the high torque mode. The detailed structural descriptions of the planetary roller screw will be elaborated in FIGS. 4 and 5. Except for rotational motion around its longitudinal axis, the clamping planetary roller screw 132 is held stationary relative to the press frame 126 by a bottom clamp support 131 and a top clamp support 134 respectively. Bearings or equivalent devices (not shown) centrally and circumferentially in the bottom clamp support 131 and the top clamp support 134 respectively for receiving the clamping planetary roller screw 132.

Referring again to FIG. 3, The roller nut 136 of the clamping planetary roller screw is coupled to the bottom tie bar platen 138. The axis of the pulley-planetary roller screw assembly is perpendicular to the horizontal axis of the bottom tie bar platen 138. The bottom tie bar platen 138 and the top tie bar platen 142 are parallel to each other, while the plurality of tie bars 140 are perpendicular to the platens 138 and 142. The top mold 144 is coupled to the bottom surface of the top tie bar platen 142. In the clamping cycle which will be described in detail in FIGS. 9 and 10, the pulley 130 and the clamping planetary roller screw 132 operate at high speed to bring the top and bottom tie bar platens downwards such that the top mold 144 and the bottom mold clamp securely as one assembly. The tie bars 140 moves slidably through side bores 153 of a central platen 152 and side bores 135 of a support platen 134.

In FIG. 3, the transfer axis 124 consists of a pulley 148, a transfer platen 149, a plurality of transfer guiding rods 157, a transfer planetary roller screw 150 and a plurality of transfer plungers 154. The pulley 148 is coupled to a transfer motor 164 for receiving power therefrom over a belt 160. Although the transfer motor 164 is shown attached to the two-speed gearbox 128, it is not coupled to it. The pulley 148 is further coupled to the transfer planetary roller screw 150 for exerting a plurality of velocities to the transfer plungers during the transfer cycle. The characteristics of the transfer axis is described in detail in FIG. 11 below. Except for rotational motion around its longitudinal axis, the transfer planetary roller screw 150 is held stationary relative to the press frame 126 by a bottom transfer support 151 and the central platen 152. Bearings or similar devices (not shown) are disposed centrally and circumferentially in the bottom transfer support 151 and the central platen 152 for receiving the transfer planetary roller screw 150. The axis of the transfer axis 124 is aligned concentrically with the axis of the clamping axis 122 such that the transfer platen 149 moves along a path parallel to the axis of the transfer guiding rods 157 when the top mold 144 encapsulates the cavities of the bottom mold 158 during the clamping and transfer cycles. The transfer guiding rods 157 are parallel to the tie bars, and the transfer platen 149 and transfer support 151 are perpendicular to the transfer guiding rods 157. The details of the resin pellet heating and loading sequences are not shown in FIG. 3 in order not to obscure the present invention.

In FIG. 3 a simplified version of the two speed gear box 128 is illustrated. The two speed gear box consists among other parts a clamping motor 162, a speed reducer and a plurality of clutches. The two speed gear box 128 enables the clamping axis 122 to have at least two modes—a high speed mode and a high torque mode—along one axis. The clamping motor 162 is coupled to a high speed clutch or a high torque clutch over an output shaft 200 for providing a plurality of rotational speeds for the high speed mode and torque during the clamping cycle. Similarly, the transfer motor 164 is coupled to the pulley 148 over the belt 160 for providing a plurality of rotational speeds during the transfer cycle.

Figures 4, 5:
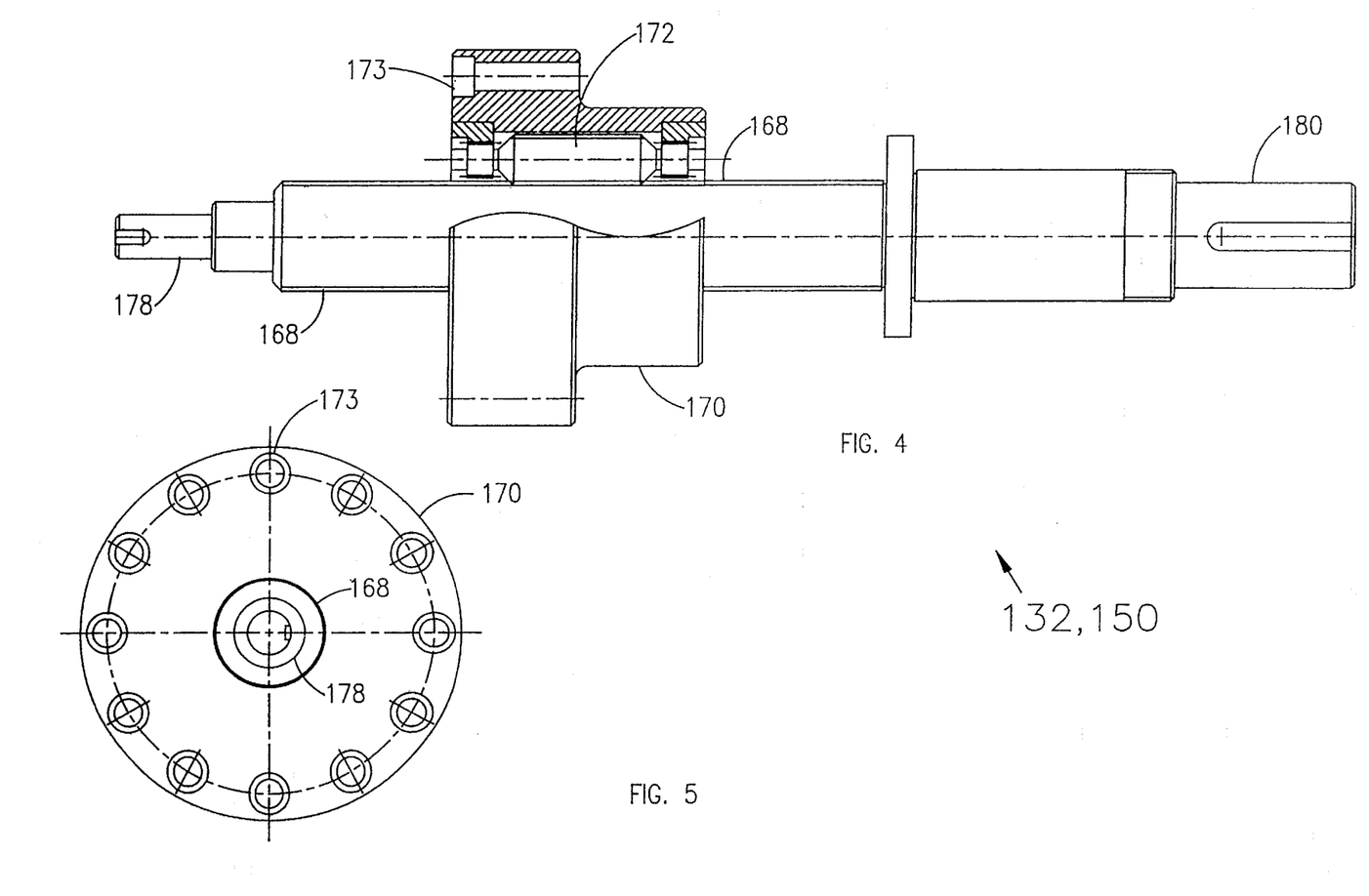
FIG. 4 is a side sectional view of one planetary roller screw which is partially broken away to show one planetary roller of the planetary roller screw as part of the clamping and transfer axes of the electro-mechanical press in accordance to FIG. 3.
FIG. 5 is a front sectional view of the planetary roller screw taken along the line A—A of FIG. 4.

FIG. 4 is side sectional view of planetary roller screws 132 and 150 used in the preferred embodiment of the present invention. Each planetary roller screw has a screw 168 (grooves not shown), a roller nut 170, a plurality of planetary screws 172, an upper portion 178 and a lower portion 180. In the preferred embodiment of the present invention, the upper portion and the lower portion are used for accommodating a plurality of bearings (not shown). The roller nut is partially broken away to show a planetary screw 172 disposed between the groove surface of the screw 168 and the inner wall of the roller nut. The plurality of planetary rollers 172 roll slip-free in the roller nut against internal groove (not shown) on the screw 168 so that the planetary roller screw can rotate at very high speed and withstand high clamping tonnage at the same time.

FIG. 5 is a front sectional view of a planetary roller screw taken along line A—A of FIG. 4. The end plate of the roller nut 170 has a plurality of tightening holes 173. In the centre is a screw 168 having a narrower upper portion 178. With reference to FIG. 3 the roller nut is coupled to the bottom tie bar platen 138 for moving the clamping axis 122 slidably along a path parallel to the longitudinal axis of the clamping planetary roller screw 132. Similarly in FIG. 3 the roller nut is coupled to the transfer platen 149 for moving the transfer axis slidably along a path parallel to the longitudinal axis of the transfer planetary roller screw 150.

Figure 6:
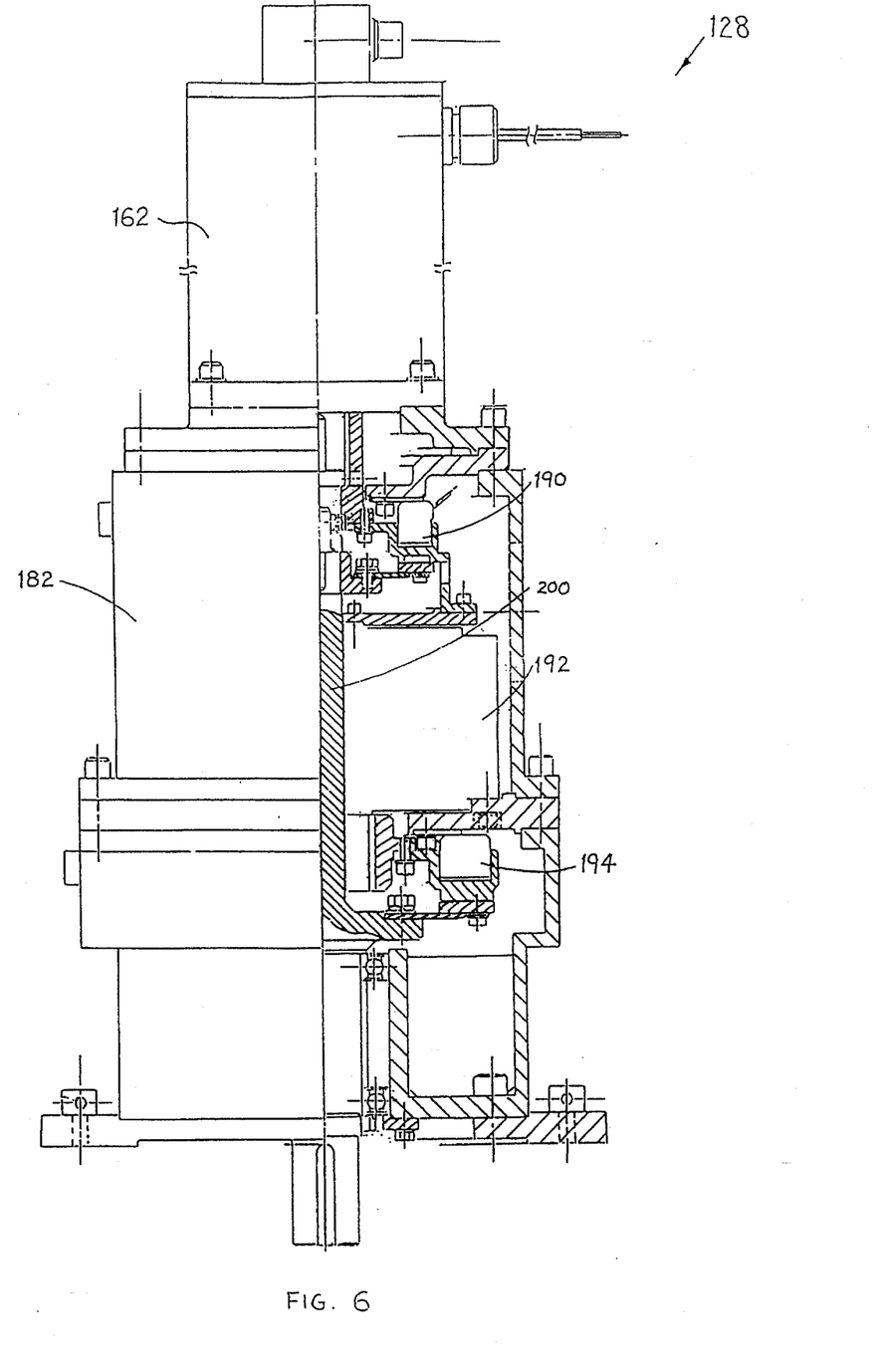
FIG. 6 is a side elevational view which is partially broken to show the speed reducer, high speed clutch and high torque clutch of the two-speed gearbox of the present invention.

FIG. 6 is a side sectional view which is partially broken to illustrate the various components of the two speed gear box used in the present invention. The two speed gear box 128 comprises a clamping motor 162 supported by a gearbox frame 182. The clamping motor 162 is coupled axially to a high speed clutch 190 and a high torque clutch 194 over the output shaft 200 (shaded). While the high speed clutch 190 is activated during the high speed mode of the clamping cycle, the high torque clutch 194 is disabled. Likewise, the high torque clutch 194 is activated during the high torque mode of the clamping cycle, and the high speed clutch 190 is disabled. The output of the clamping motor 162 is coupled to the high speed clutch 190 for receiving rotational output therefrom. The high speed clutch 190 is further coupled to the input of a speed reducer 192 whose output is coupled to the high torque clutch 194 for amplifying the torque output (slow speed) output from the clamping motor 162 during the high torque mode. As such, the output shaft 200 delivers the necessary driving force to the clamping axis over the belt 146 (not shown). The combination of the two-speed gearbox 128 and the planetary roller screw 132 permits the press of the present invention to achieve speeds and clamping tonnage which were previously unknown. As will be described in FIG. 7, the control for the press 10 is significantly enhanced with the unique closed-loop feedback system for the present invention.

Figure 7:
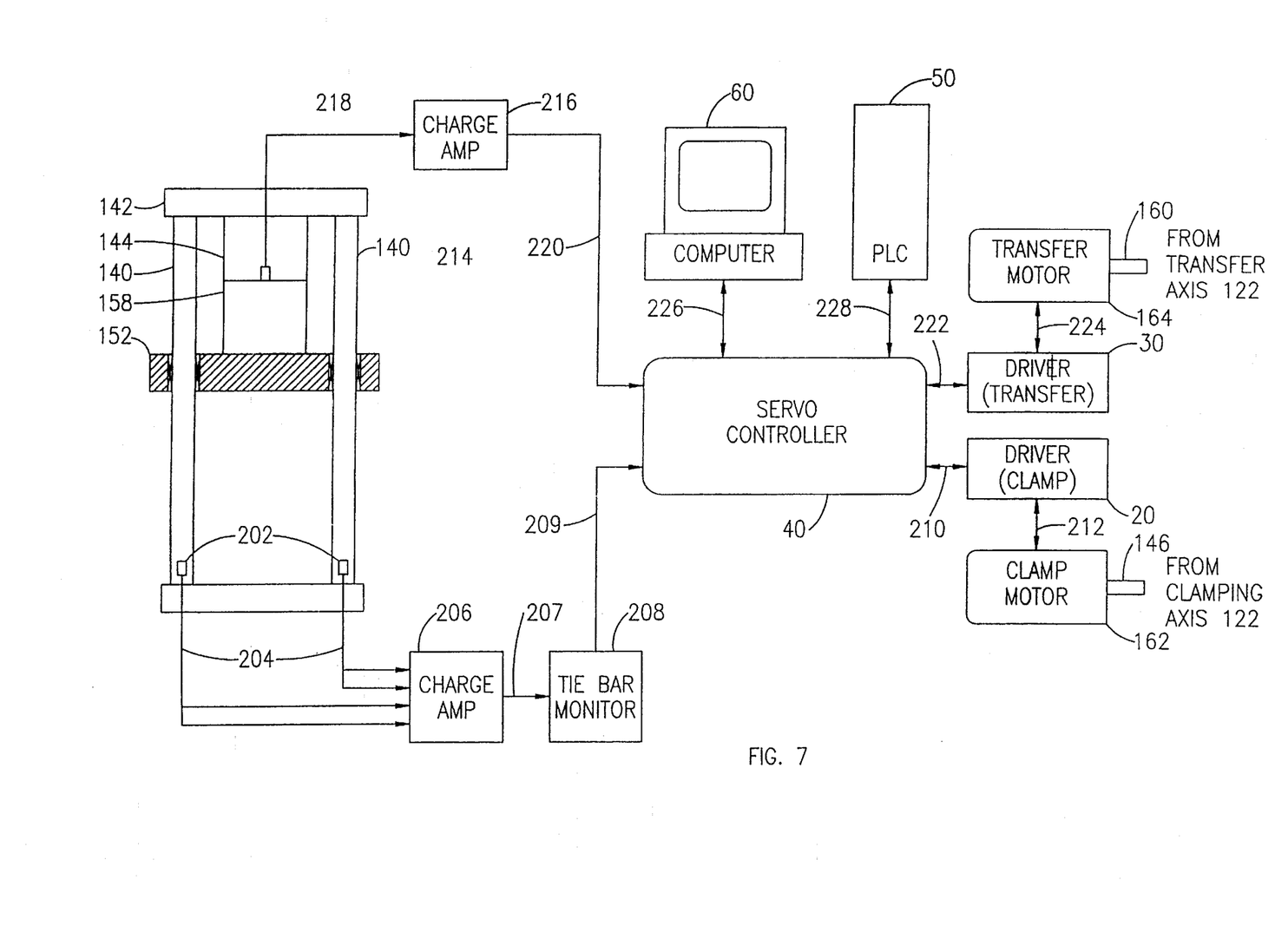
FIG. 7 is a block diagram illustrating the closed-loop control for the clamping and transfer axes of the preferred embodiment of the present invention.

FIG. 7 is a block diagram illustrating the unique closed-loop control system of the present invention. The clamping driver 20, transfer driver 30, servo controller 40, programmable logic controller 50 and the computer 60 are identical to the block diagram in FIG. 1. Partial sections of the direct drive electro-mechanical press 10 and the two speed gear box 128 are shown coupled to the closed-loop control system to better illustrate its unique features. The closed-loop control provides feedback control along the clamping axis 122 on one hand and the transfer axis 124 on the other hand. In prior art systems, the clamping driver 20 and the transfer driver 30 are coupled to the servo controller 40 and further to the servo motors for providing feedback on velocity, position and torque information of the tie bars as well of the mold blocks. Because of friction loss, inertia and etc from the links or joints in the system, the feedback provided by the drivers to the servo motors are disproportionate to the actual forces asserted on the joints. As a result the repeated amplification of this disporportionate drive cause unstable control of the system. To address this issue, the present invention supplements the feedback from the drivers with direct feedback on the torque on the clamping and transfer axes.

The closed-loop control for the clamping axis comprises a soft-close sensor 143, at least one sensor transducer 202 being located at the base of each tie bar 140, a charge amplifier 206 coupled thereto, a tie bar monitor 208 coupled thereto, servo controller 40 coupled thereto, clamping driver 20 coupled thereto, and clamping motor 162 coupled thereto. In the preferred embodiment of the present invention, the soft-close sensor 143 (manufactured by Keyence; part number #SH-110) is positioned besides the parting surface of the mold for detecting whether the molds are closed. In addition, the soft-close sensor is coupled to the servo-controller 40 for transmitting the position information of the molds. Moreover, there are four sensing transducers 202 (manufactured by Kistler; part number #9601A1210) embedded at the base of four tie bars 140 for determining if the soft-close tonnage has been reached. Soft-close tonnage refers to a threshold parameter which usually is a fraction of the clamping tonnage; it is used in the preferred embodiment of the present invention to safeguard against the debris and foreign particles being lodged between the parting surface of the molding blocks before the molds are clamped fully. Without testing the soft-close tonnage, debris and foreign particles may damage the molding blocks permanently. The sensing transducers 202 are coupled to the charge amplifier 206 (manufactured by Kistler; part number #Z15238) over charge wires 204 for converting charges inputs into voltage signals. The outputs from the charge amplifier 206 are coupled to the tie bar monitor 208 (manufactured by Kistler; part number #9821Q11) over link 207 for aggregating the voltage signals therefrom. The tie bar monitor 208 is coupled to the servo controller 40 (manufactured by Mycom; part number #USC200) for determining if the difference in voltage signals from the sensing transducer is above a plurality of predetermined threshold parameters. The servo controller 40 is further coupled to the clamping motor 162 over the clamping driver 20 (manufactured by Shinko; part number #SSD 2415 SE) for enabling and disabling the two modes along the clamping axis as well as for modulating the rotational speeds therealong.

In FIG. 7 the closed-loop control for the transfer axis 124 comprise at least one pressure transducer 214 being embedded within the top mold 144, a charge amplifier 216 coupled thereto, the servo controller 40 coupled thereto, and transfer motor 164 coupled thereto over the transfer driver 30. The pressure transducer 214 (manufactured by Kistler; part #6157A) is coupled to the charge amplifier 216 (manufactured by Kistler; part #5039A332) over a charge wire 218 for converting charge signals into voltage signals. The outputs from the charge amplifier 216 is coupled to the servo controller 40 over link 220 for enabling and disabling the transfer axis according to a plurality of predetermined threshold parameters. In the preferred embodiment of the present invention, the parameter corresponds to the correct pressure within the resin compound encapsulation. Upon reaching the appropriate parameters, the servo controller 40 will send signals to the transfer driver 30 (manufactured by Shinko; part # SSD 2150 B) in order to activate or deactivate the transfer motor 164 coupled thereto.

Figure 8:
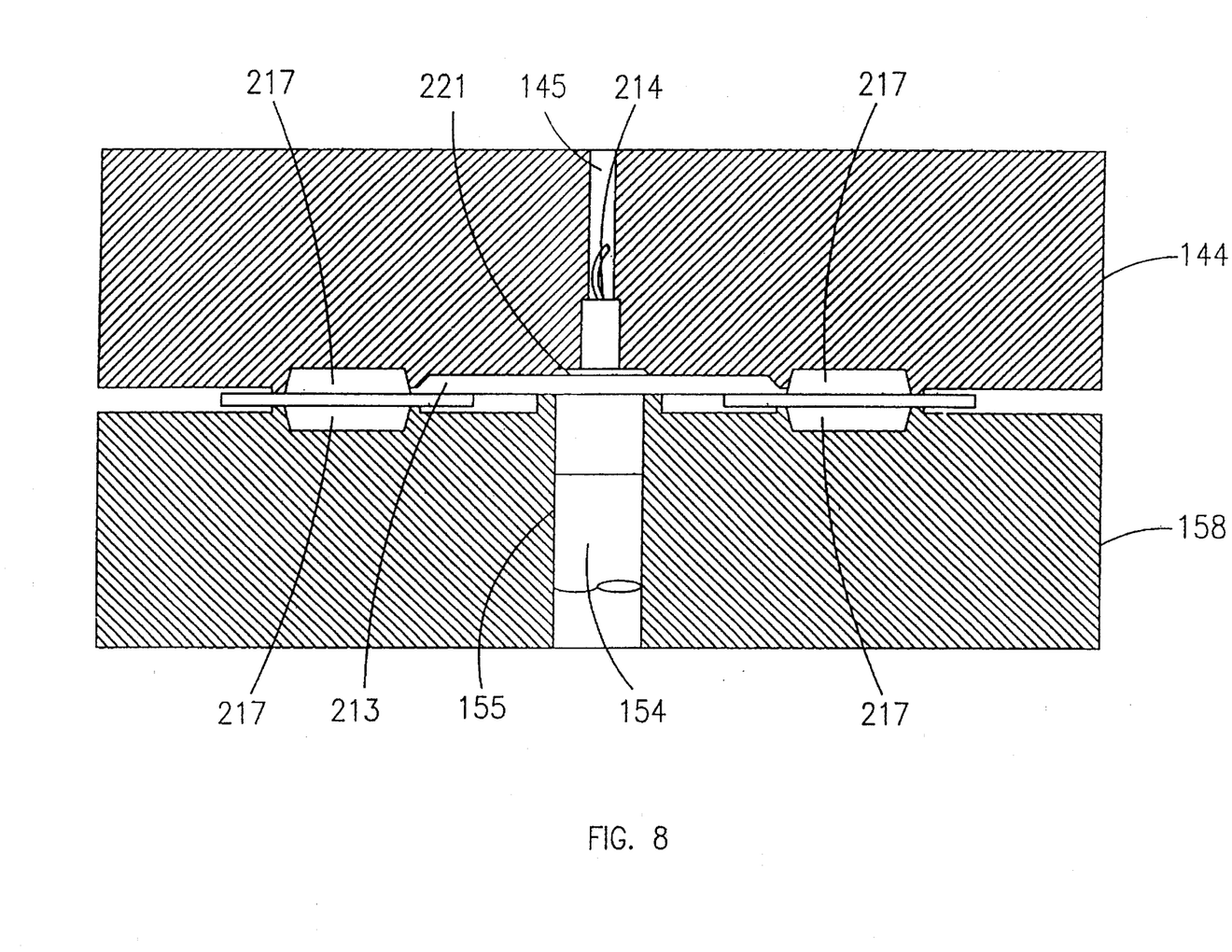
FIG. 8 is cross sectional perspective view of a molding block in a clamping position and illustrating the position of the pressure transducer being flushed with the cull bridge of a lead frame.

FIG. 8 is a side sectional view of the molding blocks in a clamped position. The top mold 144 has a centre bore 145 allowing the pressure transducer 214 to be inserted and embedded therein. The bottom mold 158 has a plurality of pots 155 (only one is shown) allowing a plurality of transfer plungers 154 (only one is shown) to inject melted resin compound into the cavities formed by the clamped position of the top mold 144 and the bottom mold 158. Sandwiched between the top mold and the bottom mold is a lead frame 215. The lead frame 215 has a plurality of encapsulation cavities 217 which communicate with a plurality of runners 213 and a plurality of culls 221. The unique construct of the cull bridge mold is disclosed in U.K. Patent No. 2,225,552 which is assigned to the same holding company as that of the assignee of the present invention. The surface of the pressure transducer 214 is flushed with the cull 221 for sensing molding pressure within the molds. Having the ability to sense the molding pressure provides feedback for the transfer axis 124.

Figure 9:
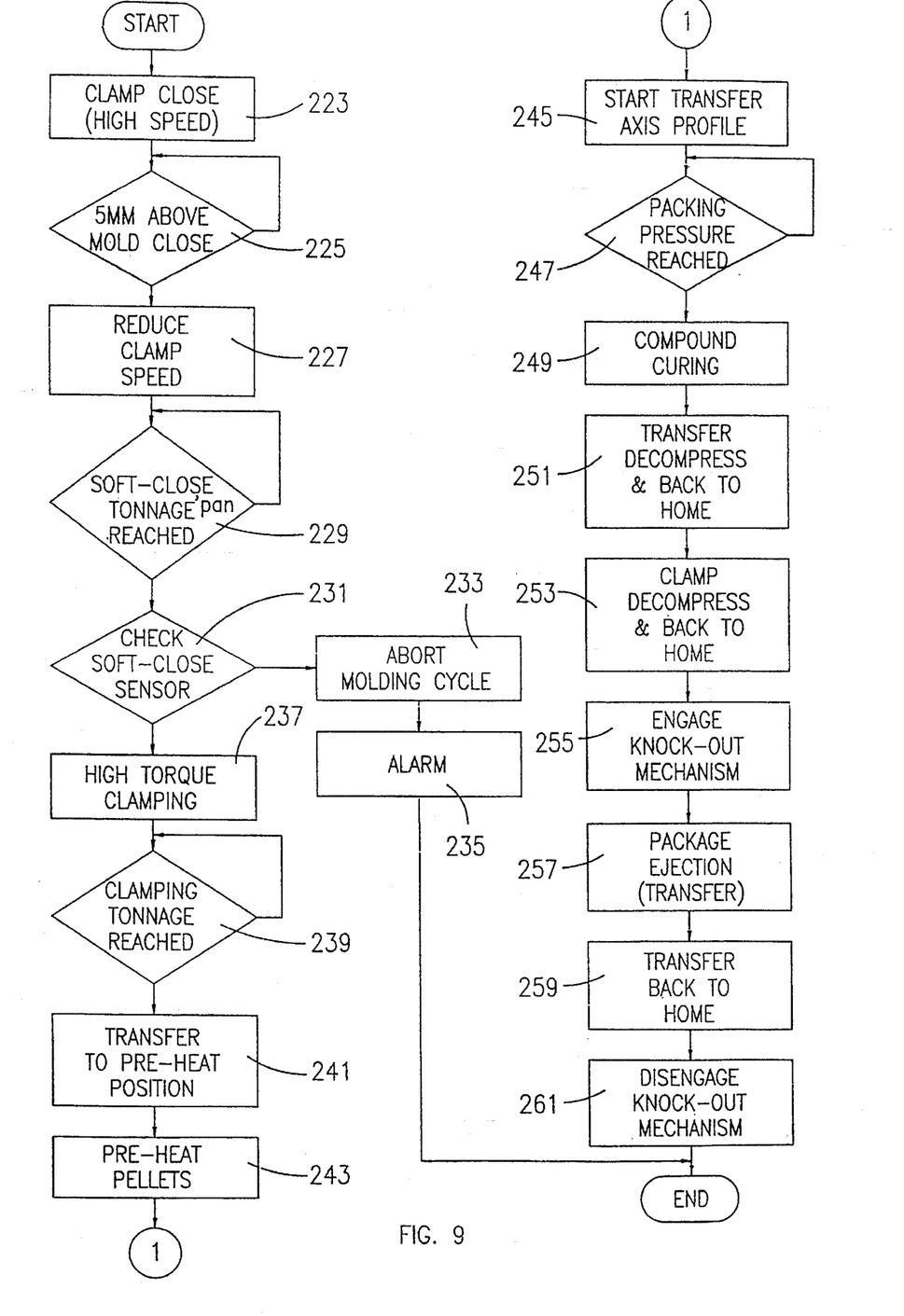
FIG. 9 is a flow chart illustrating the function of the servo controller used in the preferred embodiment of the present invention.

FIG. 9 is a flow chart illustrating the function of the servo controller used in the preferred embodiment of the present invention. The encapsulation of semiconductor devices commences with step 223 which activates the closing of top and bottom molds as illustrated in FIG. 8. In the preferred embodiment of the present invention and under the high speed mode in step 223, the servo controller 40 disables the high torque clutch 194 and enables the high speed clutch 190 in FIG. 6. At the same time, the clamping motor 162 is engaged so that it drives the clamping axis directly via the high speed clutch 190. As the high torque clutch 194 is disabled, the direct drive output from the clamping motor 162 by-passes the the speed reducer 192.

Figure 10:
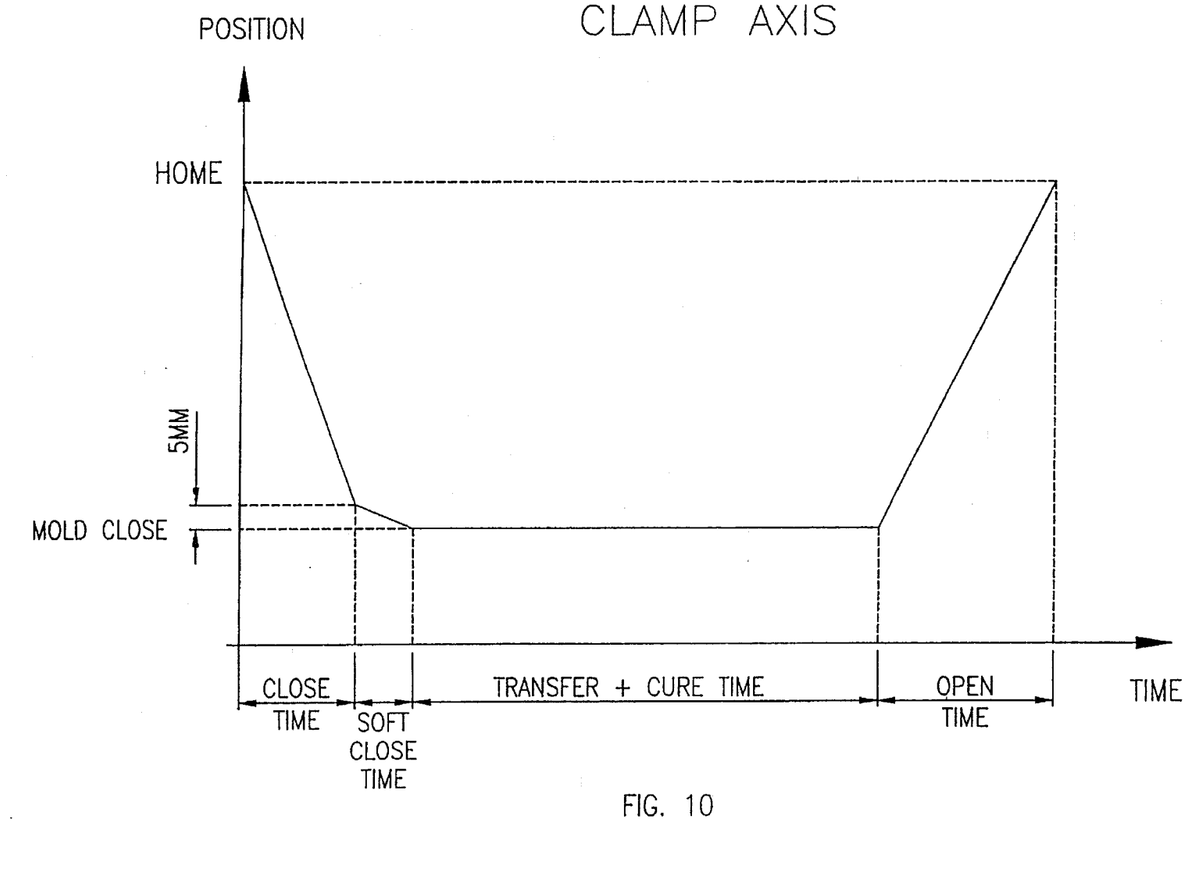
FIG. 10 is a profile of the clamping axis of the preferred embodiment of the present invention.

The characteristics of the clamping axis 122 is shown in a FIG. 10. The y-axis represents the distance between the top and bottom molds while the x-axis corresponds the time in seconds. When the molds 144 and 158 are not in the clamping or transfer cycles, they are in the "HOME" position. Step 223 is represented by the slope from "HOME" to a position where the top and bottom molds are a predetermined distance apart. In the preferred embodiment of the present invention, the predetermined distance is 5 mm. Referring again to FIG. 9, the servo controller 40 checks whether the predetermined distance has been reached in step 225. The speed attained during the high speed mode by the clamping axis is 100 mm/sec. In step 227, the servo controller 40 reduces the clamping speed once the predetermined distance between the molds has been reached. At this juncture, the servo controller 40 monitors the tie bar transducer 202 (shown in FIG. 7) to determine if the soft-close tonnage has been reached in steps 229 and 231. Once the soft-close tonnage is reached in step 229, the servo-controller 40 checks whether the soft-close sensor is activated. If the soft-close sensor is not activated, the servo controller 40 aborts the molding cycle as in step 233 and activates the alarm in step 235.

Referring again to FIG. 9, the servo controller 40 disables the high speed clutch 190 and enables the high torque clutch 194 in step 237 once the soft-close tonnage is reached. This is the high torque mode along the clamping axis: the clamping motor 162 in FIG. 6 delivers its output to the high torque clutch 194 via the speed reducer 192. The amplification in torque from the speed reducer 192 is forty times. As such, the torque generated by the clamping axis is at least fifty ton axial load. In step 239, the servo controller 40 monitors by reading the pressure transducer 202 whether a predetermined clamping tonnage has been reached. In the preferred embodiment of the present invention, the predetermined clamping tonnage is set at fifty tons. The profile of the clamping axis from step 231 to step 239 is shown by the second slope in FIG. 10 under soft-close time.

Figure 11:
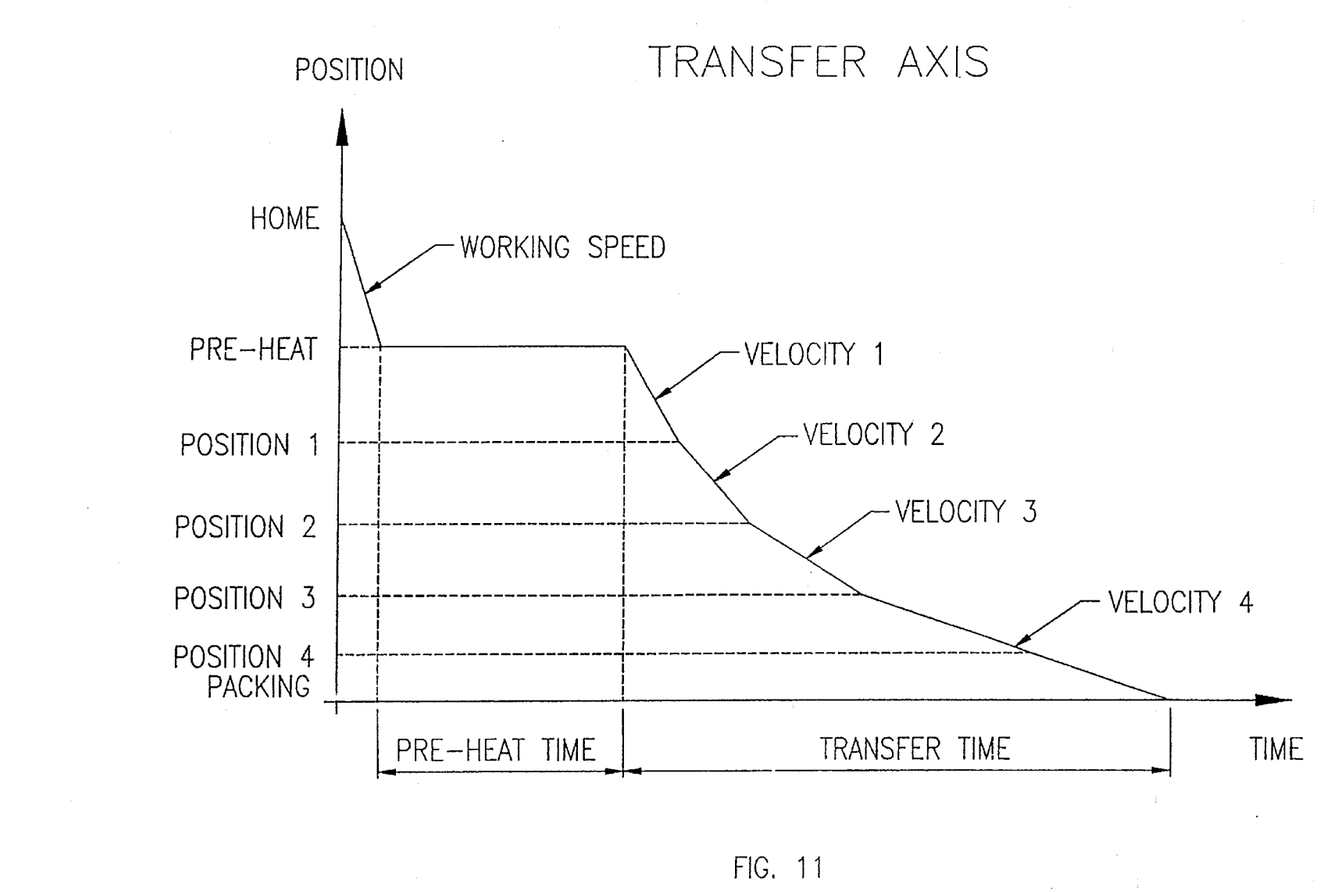
FIG. 11 is a profile of the transfer axis of the preferred embodiment of the present invention.

FIG. 11 is a profile of the transfer axis 124 once the clamping tonnage has been reached. The y-axis represents the distance between the transfer plungers 154 and the top surface of the bottom mold 158. The x-axis corresponds to the time. The position indicated for "HOME" is the position of the transfer plungers 154 before the transfer motor 164 is activated by the servo controller 40. Once the clamping tonnage has been achieved as in step 239, the servo controller 40 maintains the clamping tonnage and commences the pre-heating of the resin pellets as in steps 241 and 243. The apparatus and method of pre-heating the resin pellets are well known in the art. Therefore they are not illustrated nor described in order not to obscure the present invention. In step 241, the transfer motor 164 drives the transfer plungers 154 from "HOME" to the "Pre-heat position". During the pre-heat time of the resin pellets in step 243, the transfer axis maintains its position. Upon the expiration of the pre-heat time, the servo controller 40 commences with the transfer profile as in step 245 with a plurality of velocities in response to the feedbacks from the transfer motor driver 30. In step 247 the feedback signals from the pressure transducer 214 are compared with a predetermined packing pressure. If the packing threshold is reached, the curing process for the resin compound commences in step 249. At the conclusion of the curing process, the transfer axis decompresses and moves the transfer plungers 154 back to the "HOME" position in step 251. This is accomplished by the reversing the transfer motor 164. This is closely followed by the decompression of the clamping axis in step 253 and illustrated by the last slope under "open time" in FIG. 10. The remaining steps are well known in the prior art: in step 255, the knock-out mechanism is activated; in step 257, the lead frame package is ejected by the ejector rod 156; in step 259, the transfer platen is moved back to the "HOME" position; and finally, in step 261, the knock-out mechanism is disengaged.

While the present invention has been described particularly with reference to FIGS. 1 to 11 with emphasis on the direct drive electro-mechanical press and the associated closed-loop control for encapsulating semiconductor devices, it should be understood that the figures are for illustration only and should not be taken a limitation on the invention. In addition, it is clear that the apparatus of the present invention has utility in many applications where proportionate drive in manufacturing is required. It is contemplated that many changes and modifications may be made by one of ordinary skill in the art without departing from the spirit and the scope of the invention as described.

I claim:

1. A molding system for encapsulating semiconductor devices including a computer, a programmable logic control, a servo motor controller, and at least two drivers, said servo motor controller being coupled to said computer and said programmable logic control respectively, said servo motor controller being further coupled to said drivers, said system comprising:

a clamping means for clamping together at least one set of top and bottom molds, said clamping means having a clamping axis;

a transfer means for directing molding compound into the cavity formed by the space between at least one set of top and bottom mold, said transfer means having a transfer axis;

a gear switching means coupled to a clamping drive source and to said clamping means for alternating between a high speed mode and a high torque mode along said clamping axis; and a closed-loop control means coupled to said clamping means and said transfer means for providing direct feed back thereto in minimizing disproportionate drive along said clamping and transfer axes respectively.

2. A molding system according to claim 1 wherein said clamping axis comprising a top platen and a bottom platen in horizontal and parallel relationship with each other, said axis further having a plurality of tie bars, said tie bars being in vertical and parallel relationship with each other, said bottom platen being further coupled to a first planetary roller screw for moving said clamping axis in a direction parallel to said tie bars.

3. A molding system according to claim 1 wherein said transfer axis comprising a central platen and a transfer platen in horizontal and parallel relationship with each other, said transfer platen being further coupled to a second planetary roller screw for moving said transfer means in a direction parallel to said transfer axis, said transfer axis being in a slidably and parallel position in relation to said clamping axis.

4. A molding system according to claim 1 wherein said gear switching means further comprising at least one high speed clutch, said high speed clutch being coupled to a high torque clutch and a speed reducer over an output shaft for alternating between said high speed mode and said high torque mode in response to a soft-close threshold parameter.

5. A molding system according to claim 1 wherein said closed-loop control comprises at least one pressure transducer being located within each said tie bar for sensing the force asserted on said clamping axis, said transducers being further coupled to a charge amplifier for converting the charge signals into voltage signals, said charge amplifier being further coupled to a monitor for aggregating the voltage outputs from said charge amplifier, said monitor being further coupled to said servo controller for regulating the outputs from servo motors connected to said axes in order to minimize the disproportionate drive along said clamping and transfer axis.

6. A molding system according to claim 2 wherein said clamping axis is above said transfer axis, said clamping axis having a slidable and parallel relationship with said transfer axis.

7. A molding system for encapsulating semiconductor devices including a computer, a programmable logic control, a servo motor controller, and at least two drivers, said servo motor controller being coupled to said computer and said programmable logic control respectively, said servo motor controller being further coupled to said drivers, said system comprising:

a clamping means for clamping together at least one set of top and bottom molds, said clamping means having a clamping axis;

a transfer means for directing molding compound into the cavity formed by the space between at least one set of top and bottom mold, said transfer means having a transfer axis;

a gear switching means coupled to said clamping means for alternating between a high speed mode and a high torque mode along said clamping axis;

a closed-loop control means coupled to said clamping means and said transfer means for providing direct feed back thereto in minimizing disproportionate drive along said clamping and transfer axes respectively; and wherein said closed-loop control comprises at least one pressure transducer being located within each said tie bar for sensing the force asserted on said clamping axis, said transducers being further coupled to a charge amplifier for converting the charge signals into voltage signals, said charge amplifier being further coupled to a monitor for aggregating the voltage outputs from said charge amplifier, said monitor being further coupled to said servo controller for regulating the outputs from servo motors connected to said axes in order to minimize the disproportionate drive along said clamping and transfer axis.

* * * * *

UNITED STATES PATENT AND TRADEMARK OFFICE
CERTIFICATE OF CORRECTION

PATENT NO. : 5,522,713
DATED : 4 June 1996
INVENTOR(S) : Tiang S. Lian

It is certified that error appears in the above-indentified patent and that said Letters Patent is hereby corrected as shown below:

Column 3, line 35, "art" should be --arts--.

Column 3, line 39, after "those" insert --that--.

Column 4, line 37, "and" should be --end--.

Column 4, line 46, "76" should be --78--.

Column 5, line 3, after "into", "top" should be --bottom--.

Column 5, line 49, "The" should be --the--.

Column 6, line 39, after "is" insert --a--.

Column 9, line 4, after "in" delete "a".

Column 10, line 14, after "taken" insert --as--.

Signed and Sealed this

Seventeenth Day of December, 1996

Attest:

BRUCE LEHMAN

*Attesting Officer*    *Commissioner of Patents and Trademarks*